(12) United States Patent
Schuller et al.

(10) Patent No.: US 9,581,177 B2
(45) Date of Patent: Feb. 28, 2017

(54) CLUTCH TRANSMISSION

(75) Inventors: Dietmar Schuller, Altmannstein (DE);
Hans-Peter Fleischmann, Stammham (DE); Andreas Deimel, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 504 days.

(21) Appl. No.: 14/115,728

(22) PCT Filed: Apr. 30, 2012

(86) PCT No.: PCT/EP2012/001850
§ 371 (c)(1),
(2), (4) Date: Feb. 3, 2014

(87) PCT Pub. No.: WO2012/152396
PCT Pub. Date: Nov. 15, 2012

(65) Prior Publication Data
US 2014/0373524 A1 Dec. 25, 2014

(30) Foreign Application Priority Data

May 6, 2011 (DE) .................. 10 2011 100 803

(51) Int. Cl.
*F16H 57/04* (2010.01)
*F15B 15/20* (2006.01)
(Continued)

(52) U.S. Cl.
CPC ......... *F15B 15/202* (2013.01); *F16H 57/0413* (2013.01); *F16H 57/0473* (2013.01); *F16H 61/0021* (2013.01); *F16H 61/688* (2013.01)

(58) Field of Classification Search
CPC .................. F16H 57/0412; F16H 57/0413
See application file for complete search history.

(56) References Cited

U.S. PATENT DOCUMENTS 6,253,837 B1 * 7/2001 Seiler .................. F16H 57/0413
137/625.29
2007/0164123 A1 7/2007 Willers et al.
(Continued)

FOREIGN PATENT DOCUMENTS

CN 101417608 A 4/2009
DE 24 29 510 A1 1/1976
(Continued)

OTHER PUBLICATIONS

International Search Report issued by the European Patent Office in International Application PCT/EP2012/001850 on Jul. 7, 2012.
(Continued)

*Primary Examiner* — F. Daniel Lopez
(74) *Attorney, Agent, or Firm* — Henry M. Feiereisen LLC (57) ABSTRACT

A clutch transmission, in particular a dual clutch transmission, includes a hydraulic circuit for actuating and/or cooling the clutch transmission. The hydraulic circuit includes at least one cooler for cooling a hydraulic medium conveyed by at least one pump, wherein a bypass with a thermostatic bypass valve is associated with the cooler. The thermostatic bypass valve has hereby three switching positions, wherein it can be moved to a first switching position by a spring force, from the first switching position to the second switching position by a thermal element against the spring force and from the second switching position to a third switching position against the spring force by a pressure difference exceeding a predeterminable limit value.

4 Claims, 2 Drawing Sheets

(51) Int. Cl.
*F16H 61/00* (2006.01)
*F16H 61/688* (2006.01)

(56) References Cited

U.S. PATENT DOCUMENTS

2008/0029246 A1* 2/2008 Fratantonio ......... F16H 57/0412
                                                          165/103
2008/0202450 A1   8/2008 Martin et al.

FOREIGN PATENT DOCUMENTS

| DE | 43 40 873 A1 | 6/1995 |
| DE | 10 2005 046 635 A1 | 2/2001 |
| EP | 1 420 186 A2 | 5/2004 |
| EP | 1 486 693 B1 | 8/2006 |
| EP | 1 814 009 A1 | 8/2007 |

OTHER PUBLICATIONS

Chinese Search Report issued on Jul. 29, 2015 with respect to counterpart Chinese patent application 201280022088.6.
Translation of Chinese Search Report issued on Jul. 29, 2015 with respect to counterpart Chinese patent application 201280022088.6.

* cited by examiner

CLUTCH TRANSMISSION

CROSS-REFERENCES TO RELATED APPLICATIONS

This application is the U.S. National Stage of International Application No. PCT/EP2012/001850, filed Apr. 30, 2012, which designated the United States and has been published as International Publication No. WO 2012/152396 and which claims the priority of German Patent Application, Serial No. 10 2011 100 803.2, filed May 6, 2011, pursuant to 35 U.S.C. 119(a)-(d).

BACKGROUND OF THE INVENTION

The invention relates to a clutch transmission, in particular a dual-clutch transmission, with a hydraulic circuit for controlling and cooling the clutch transmission, in particular the dual-clutch transmission, in particular of a motor vehicle, with two clutch cylinders and a plurality of switching cylinders which can preferably be actuated from both sides.

Dual clutch transmissions are preferably used in passenger cars. A dual clutch transmission generally includes two coaxially disposed transmission input shafts, which are each associated with a sub-transmission. A clutch is associated with each of the transmission input shafts, via which the transmission input shaft of the respective sub-transmission can be frictionally coupled to the output of an engine, preferably an internal combustion engine of a motor vehicle. A first of the two sub-transmissions typically includes the odd gears, whereas a second of the two sub-transmissions includes the even gears and the reverse gear.

Typically, one of the sub-transmissions is active while driving, which means that the transmission input shaft associated with this sub-transmission is coupled to the engine via its associated clutch. A gear providing a current gear ratio is engaged in the active sub-transmission. A controller determines whether the next higher or next lower gear is to be engaged depending on the driving situation. This gear which is probably used next is selected in the second, inactive sub-transmission. When changing gears, the clutch of the inactive sub-transmission is engaged, while the clutch of the active portion is disengaged. Preferably, opening the clutch of the active sub-transmission and closing the clutch of the inactive sub-transmission overlap so that the flow of force from the engine to the drive shaft of the motor vehicle is interrupted not at all or only briefly. As a result of the gear change, the previously active sub-transmission becomes inactive, while the previously inactive sub-transmission becomes the active sub-transmission. Thereafter, the gear expected to be used next can be engaged in the now inactive sub-transmission.

The gears are engaged and disengaged via elements, preferably via the shift rails that are actuated by hydraulic cylinders, also known as switching cylinders, which have already been mentioned above. The hydraulic cylinders are preferably formed as double-acting hydraulic cylinders, in particular synchronous cylinders or differential cylinders, so that preferably two gears may be associated with each switching cylinder. Alternatively, single-acting hydraulic cylinders may also be provided. The hydraulic cylinders operating the elements, in particular the shift rails, are also referred to as gear selector cylinders. A gear selector cylinder designed as a synchronous cylinder to which in particular two gears are assigned, has preferably three switching positions, wherein in a first switching position a first defined gear is engaged, in a second switching position another defined gear is engaged, and in a third switching position none of the two above-mentioned gears is engaged.

The clutches associated with the two sub-transmissions are also hydraulically actuated, Le. closed or opened. Preferably, the clutches each close when hydraulic pressure is applied, whereas they open when no hydraulic pressure is applied, i.e. when pressure is relieved in a hydraulic cylinder associated with the respective clutch which is also referred to as clutch cylinder, as mentioned above.

In addition, the operation of a dual clutch transmission is known per se and will therefore not be discussed here in detail.

The structure and the operation described in the preceding paragraphs apply preferably also to or are related to the subject matter of the invention.

As already indicated, dual clutch transmissions are controlled or regulated as well as cooled by a hydraulic circuit. This hydraulic circuit, or subassemblies thereof, and methods associated therewith are the object of the invention.

Conventional clutch transmissions as disclosed, for example, in the European patent EP 1 486 693 131, also include a cooler for cooling the hydraulic medium pumped by a pump. Under cold ambient conditions, a thermostatic bypass valve is provided in the cooler for a rapid warm-up of the clutch transmission. In the conventional clutch transmission, the hydraulic medium should therefore not be cooled, but bypass a cooler so as to more quickly reach, for example, an operating temperature.

Providing a bypass with a differential pressure valve is known to protect, for example, a pressure filter against excessively high pressures.

SUMMARY OF THE INVENTION

It is the object of the invention to provide a clutch transmission that prevents damage to the conveying system, i.e. to the at least one pump, and reduces high energy consumption associated with a high pressure level.

The object underlying the invention is attained with a clutch transmission having a hydraulic circuit for actuating and/or cooling the clutch transmission, wherein the hydraulic circuit includes at least one cooler for cooling a hydraulic medium conveyed by at least one pump and/or at least one pressure filter, wherein a bypass having a thermostatic bypass valve is associated with the cooler. The thermostatic bypass valve has three switching positions, wherein it can be moved in a first switching position by spring force, from the first switching position into a second switching position against the spring force by a thermal element, and from the second switching position into a third switching position against the spring force via the thermostatic bypass valve by a difference pressure of the hydraulic medium. Accordingly, a clutch transmission is provided that includes a bypass with a thermostatic bypass valve associated with a cooler, wherein the bypass valve is moved from its initial position or the first switching position by the thermal element into a second position, and from the second position as a function of the difference pressure by the bypass valve into a third switching position. The bypass valve associated with the bypass can thus be placed in three different switching positions. This results in a high flexibility of the bypass, which is now switched not only as a function of the temperature, but also as a function of pressure difference across the bypass valve.

In a particularly preferred embodiment, the bypass is opened in the first switching position, is blocked in the second switching position and is opened again in the third switching position. The bypass is or will be opened in the initial position. The thermostatic actuator of the thermostatic bypass valve is preferably designed such that the thermal element expands with increasing temperature and thereby urges the bypass valve from the first switching position into the second switching position. Consequently, the bypass is opened at low temperatures, and blocked upon reaching a predeterminable higher limit temperature. The bypass is thus opened at low temperatures, when the hydraulic medium has a high viscosity and demands high power from the pump or from a drive unit driving the pump, for example an electric motor, so that the hydraulic medium bypasses the cooler and/or a pressure filter connected upstream or downstream of the cooler. This reduces the backpressure acting upon the conveying device or the pump, so that the drive unit of the pump and/or the pump can be reduced in size because less energy is required for pumping the hydraulic medium at low temperatures. Upon reaching the predeterminable limit temperature, in particular corresponding to an operating temperature of the clutch transmission, the bypass is closed by the thermostatic actuator so that the hydraulic medium, which is then in a correspondingly advantageous viscous state, passed through the cooler and/or the pressure filter. When pressure spikes occur, which would cause the pressure difference across the bypass valve to exceed a predeterminable pressure limit value, the bypass valve is urged into its third switching position in which the bypass is again opened, so that, on one hand, the pressure filter and/or the cooler are not damaged and, on the other hand, the backpressure does not damage the conveying device or other upstream elements of the clutch transmission.

Preferably, the thermal element is constructed as a thermally expanding element that swells with increasing temperature, in particular increases in size, and thus exerts a compressive force on the bypass valve or its slider element. In this way, the thermal element can be readily arranged, for example, outside the bypass valve as a thermostatic actuator. Alternatively, an integral arrangement of the thermal element within the bypass valve with or without a link is also feasible.

Most preferably, the thermal element and/or the link are configured such that regardless of the temperature acting on the thermal element, the thermostatic bypass valve can be moved by the thermal element maximally into the second switching position. For example, the link may conceivably have a stop which allows for a maximum displacement of the link, and/or the thermal element may be constructed such that it can move the link only until the second switching position when reaching its maximum possible size. This ensures that the bypass is not unintentionally opened when the temperatures increase further. Instead, it is ensured that the bypass is opened above the limit temperature only when the pressure difference is exceeded. For constructing the thermostatic bypass valve as a differential pressure valve for attaining the third switching position, the thermostatic bypass valve preferably includes at least one valve face to which the pressure of the hydraulic circuit upstream or downstream of the thermostatic bypass valve is applied. The pressure acting on the valve face can then counteract a spring force and/or the pressure downstream or upstream of the thermostatic bypass valve. In this way, the pressure difference for moving the bypass valve to its third switching position is reliably taken into account.

Furthermore, the link is positively guided by the thermal element and/or a spring element is associated with the link which counteracts the thermal element, in particular the expanding thermal element. When the link is positively guided by the thermal element, the link is fixedly connected to the thermal element, and is displaced by the thermal element both in one direction upon expansion of the thermal element, as well as in the opposite direction upon shrinkage of the thermal element. The link is alternatively or in addition held in intimate contact on the thermal element by the spring element, making a fixed connection between the thermal element and the link unnecessary. When the specified pressure difference is exceeded, the bypass valve or a valve slider of the bypass valve preferably separates from the link.

BRIEF DESCRIPTION OF THE DRAWING

The hydraulic circuit of the invention will be now described in detail with reference to the drawing, wherein.

DETAILED DESCRIPTION OF PREFERRED EMBODIMENTS

Figure 1:
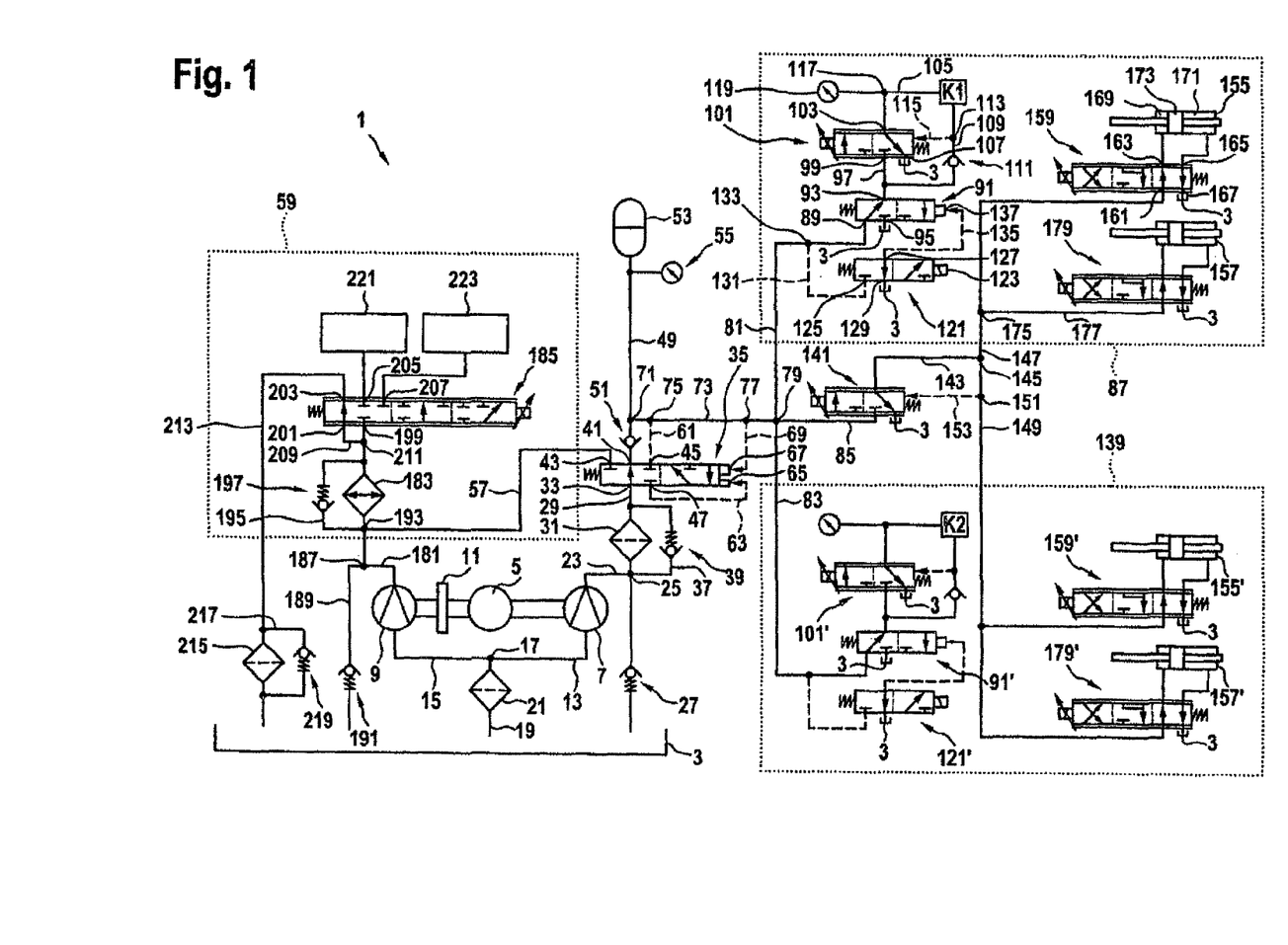
FIG. 1 shows a first embodiment of a hydraulic circuit for actuating a dual clutch transmission.

FIG. 1 shows a hydraulic circuit 1 which is used to actuate, and in particular to couple and engage and disengage gears of a dual clutch transmission and to cool the transmission. The hydraulic circuit 1 includes a tank 3, serving in particular as a reservoir or sump for a hydraulic medium used for operation and cooling, in which the hydraulic medium is preferably stored unpressurized. An electric motor 5 driving a first pump 7 and a second pump 9 is provided. Preferably, the speed and direction of rotation of the electric motor 5 can be controlled, preferably regulated. The first pump 7 is fixedly connected to the electric motor 5, i.e. without a separating element. In other words, the pump 7 is always driven when the electric motor 5 is running and the hydraulic medium is preferably conveyed in the same direction in the both directions of rotation. The pump 9 is preferably connected to the electric motor 5 by way of a separating element 11. Accordingly, the pump 9 can be decoupled from the electric motor 5, so that the pump 9 is not running when the electric motor 5 is running. The separating element 11 is preferably formed as a clutch or an overrunning clutch, wherein in the second situation the direction of rotation of the electric motor 5 determines whether hydraulic medium is conveyed by the pump 9 or not.

The first pump 7 and the second pump 9 are each connected via a corresponding conduit 13, 15 with a junction 17 into which an additional conduit 19 opens. This additional conduit 19 connects the tank 3 to the junction 17 through a suction filter 21. Overall, inlets of the pump 7, 9 are thus connected with the tank 3 via the conduits 13, 15, the junction 17 and the conduit 19 having the suction filter 21.

The outlet of the first pump 7 is connected to a conduit 23 which leads to a junction 25. The junction 25 is connected to the tank 3 via a pressure relief valve 27. The pressure relief valve 27 can open under overpressure in the direction of the tank 3. Furthermore, a conduit 29, which leads via a pressure filter 31 to a port 33 of a switching valve 35, originates from the junction 25.

The pressure filter 31 may be bypassed by a bypass 37, wherein a differential pressure valve 39 is arranged in the bypass 37, which allows bypassing the filter 31 in the direction of the connection 33 under overpressure. The differential pressure valve 39 opens starting at a preset differential pressure across the pressure filter 31.

The switching valve 35 is embodied as a 5/2-way valve, which has four additional ports 41, 43, 45, 47 in addition to the port 33. In a first switching state of the switching valve 35 shown in FIG. 1, the port 33 is connected to the port 41, whereas the other ports 43, 45 and 47 are connected blind, i.e. they are closed. The port 41 opens into a conduit 49 in which a check valve is disposed 51. The conduit 49 leads to a pressure accumulator 53, wherein a pressure sensing device 55 is hydraulically connected to the conduit 49 upstream of the pressure accumulator 53.

In a second switching state of the switching valve 35 illustrated in FIG. 1, the port 33 is connected to the port 43 which opens into a conduit 57 that leads to a hydraulic sub-circuit 59 which is used, in particular, to cool the clutches of the dual clutch transmission. In this second switching state, the port 41 is connected blind, and the port 45 is connected to the port 47. In this case, a conduit 61 opens into the port 45 which is subjected to the pressure of the hydraulic medium in the pressure accumulator 53. The port 47 opens into a conduit 63 which is hydraulically connected to a first valve face 65 of the switching valve 35. A second valve face 67 of the switching valve 35 is permanently subjected to the pressure of the pressure accumulator 53 via a conduit 69.

A conduit 73 branches off from the conduit 49 at a junction 71, from which the conduit 61 branches off at a junction 75, and the conduit 69 branches off at a junction 77. The junction 71 is connected to the check valve 51 on the side facing away from the switching valve 35.

The conduit 73 opens into a junction 79, from which the conduits 81, 83 and 85 originate.

The conduit 81 supplies a first sub-transmission in a sub-transmission circuit 87. The first sub-transmission has a clutch K1. The conduit 81 opens into a port 89 of a switching valve 91 which is constructed as a 3/2-way valve and serves as a safety valve for the clutch K1. In a first illustrated switching state of the switching valve 91, the port 89 is hydraulically connected to a port 93, while a port 95 of the switching valve 91 is switched blind. In a second switching state of the switching valve 91 which can be inferred from FIG. 1, the port 93 is connected to the port 95 and via the latter to the tank 3, while the port 89 is connected blind. As will become apparent below, the clutch K1 is switched without an applied pressure in this second switching state.

The port 93 is connected to a conduit 97 and via the latter to a port 99 of a pressure control valve 101. The pressure control valve 101 is designed as 3/2-way proportional valve having a port 103 which is connected via a conduit 105 to the clutch K1. The pressure control valve 101 additionally has a port 107 that is connected to the tank 3. In a first extreme state of the pressure control valve 101 the port 99 is connected to the port 103, while the port 107 is connected blind. The full pressure prevailing in the conduit 97 of the hydraulic medium is then applied to the clutch K1. In a second extreme state, the port 103 is connected to the port 107 so that the clutch K1 is not pressurized. The pressure control valve 101 regulates the pressure prevailing in the clutch K1 in a conventional manner through proportional variation between these extreme states. A conduit 109 leads from the clutch K1 via a check valve 111 back to the conduit 97. If the pressure in the clutch K1 rises due to the pressure in the conduit 97, the check valve 111 opens, thereby opening a hydraulic connection between the clutch K1 to the conduit 97 via the conduit 109. A conduit 115 branches off from the conduit 109 at a junction 113 which returns the pressure in the clutch K1 as a control variable to the pressure control valve 101.

The conduit 105 includes a junction 117 for hydraulically operatively connecting a pressure detecting device 119. The pressure prevailing in the clutch K1 is thereby detected by the pressure detecting device 119.

The switching valve 91 is controlled by a pilot valve 121 which is actuated by an electric actuator 123. It is formed as a 3/2-way valve and includes the ports 125, 127 and 129. The port 125 is connected via a conduit 131 to a junction 133 provided in the conduit 81. The port 127 is connected by a conduit 135 to a valve face 137 of the switching valve 91. In a first illustrated switching state of the pilot valve 121, the port 125 is switched blind while the port 127 is connected to the port 129 and via the latter to the tank 3, whereby the valve face 137 of the switching valve 91 is switched unpressurized via conduit 135. Preferably, the pilot valve 121 assumes this switching state when no electric control signal is applied to the actuator 123. In a second assumable switching state of the pilot valve 121, the port 125 is connected to the port 127 while the port 129 is connected blind. In this case, the pressure in the conduit 81 operates on the valve face 137 of the switching valve 91 via the junction 133, the conduit 131 and the conduit 135, causing the switching valve 91 to switch against a biasing force into its second switching state where the port 93 is hydraulically connected to the port 95, so that the clutch K1 is unpressurized. Thus, the switching valve 91 can preferably be operated by way of electrical control of the pilot valve 121, so that the clutch K1 is unpressurized and the clutch K1 is hence open.

The conduit 83 originating at the junction 79 is used to supply a clutch K2 of a hydraulic sub-circuit 139 of a second sub-transmission. Control of the clutch K2 also includes a switching valve 91', a pilot valve 121', and a pressure control valve 101'. The operation is identical to the operation already described in conjunction with the first clutch K1. Reference is therefore made to the corresponding description of the sub-transmission circuit 87. The hydraulic actuation of the clutch K2 corresponds to that of the clutch K1.

The conduit 85 originating at the junction 79 is connected to a pressure control valve 141, via which the pressure of the hydraulic medium in a conduit 143 can be controlled. The operation of the pressure control valve 141 preferably corresponds to the operation of the pressure control valves 101, 101', thus making a renewed description unnecessary. The conduit 143 is connected to a junction 145, from which a conduit 147 and a conduit 149 originate. A junction 151 at which a conduit 153 originates is provided in the conduit 149, via which the pressure prevailing in the conduit 149 and thus also in the conduit 143 is returned to the pressure control valve 141 as a control variable. It is apparent that the junction 151 may also be provided in the conduits 151 or 147.

The conduit 147 is used to supply gear actuator cylinders 155 and 157 in the sub-transmission circuit 87, which are constructed as two double-acting cylinders, i.e. synchronizing cylinders.

A volume control valve 159 is provided for hydraulic actuation of the gear actuating cylinder 155, which is designed as a 4/3-way proportional valve. It has four ports 161, 163, 165 and 167. The first port 161 is connected to the conduit 147, the second port 163 is connected to a first chamber 169 of the gear actuating cylinder 155, the third port 165 is connected to a second chamber 171 of the gear actuating cylinder 155 and the fourth port 167 is connected to the tank 3. In a first extreme state of the volume control valve 159, the first port 161 is connected to the second port 163, while the third port 165 is connected to the fourth port 167. The hydraulic medium can then flow from the conduit 147 into the first chamber 169 of the gear actuating cylinder 155, while the second chamber 171 is connected to the tank 3 unpressurized via the ports 165, 167. A piston 173 of the gear actuating cylinder 155 is then moved in a first direction, for example for disengaging a specific gear of the dual clutch transmission or for engaging another specific gear.

In a second extreme state of the volume control valve 159, both the port 163 and the port 165 are connected to the port 167, while the port 161 is connected blind. In this way, both chambers 169, 171 of the gear actuating cylinder 155 are connected to the tank 3 and unpressurized. The piston 173 of the gear actuating cylinder 155 then remains in its current position due to the absence of forces.

In a third extreme state of the volume control valve 159, the port 161 is connected to the port 165 and the port 163 is connected to the port 167. Hydraulic medium then flows from the conduit 147 into the second chamber 171 of the gear actuating cylinder 155, and the first cylinder chamber 169 is unpressurized in relation to the tank 3 via port 163 and the port 167. The hydraulic medium then exerts a force on the piston 173 of the gear actuating cylinder 155 such that the piston 173 is displaced in a second direction opposite to the first direction. In this way, the aforementioned specified other gear can be disengaged, or the aforementioned specified gear can be engaged.

As described above, the volume control valve 159 is designed as a proportional valve. The hydraulic medium flow coming from the conduit 147 is divided into the chambers 169, 171 by varying the valve states between the three extreme states, so that a defined speed for engaging or disengaging a gear can be specified by controlling/regulating the volume flow.

A conduit 177 which opens into a volume control valve 179 used to control the gear actuating cylinder 157 branches off from the conduit 147 at a junction 175. The operation of the hydraulic control of the gear actuating cylinder 157 is then identical to that described in conjunction with the gear actuating cylinder 155, making repeating the description unnecessary.

The conduit 149 is used to supply gear actuating cylinders 155' and 157' of the second sub-transmission in the sub-transmission circuit 139, which are also controlled by volume control valves 159' and 179'. The sub-transmission circuits 87 and 139 for controlling the gear actuating cylinders 155, 155' and 157, 157', respectively, are constructed identically, so reference is made to the preceding description.

The outlet of the pump 9 is connected to a conduit 181 which leads to the hydraulic sub-circuit 59 which is preferably used in particular for cooling the clutches K1, K2. The conduit 181 runs via a cooler 183 to a volume control valve 185. A junction 187 is arranged in the conduit 181 downstream of the outlet of the pump 9 and upstream of the cooler 183, from which a conduit 189 branches off that leads to the tank 3 via a pressure relief valve 191 opening toward the tank 3. A junction 193 into which the conduit 57 opens is arranged downstream of the junction 187 and upstream of the cooler 193, with the conduit 57 coming from the switching valve 35 and being connected to its port 43. The hydraulic sub-circuit 59 can be supplied via the conduit 57 with hydraulic medium conveyed by the pump 7, when the switching valve 35 is in its second switching state. Furthermore, a bypass 195 branches off from the junction 193 which has a differential pressure valve 197 and is arranged parallel to the cooler 183. The differential pressure valve 197 opens the bypass in the direction of the volume control valve 185 under overpressure. The cooler 183 can thus be bypassed.

The volume control valve 185 is designed as 4/3-way switching valve having ports 199, 201, 203, 205 and 207. The port 199 is connected to the conduit 181 via the cooler 183 and the differential pressure valve 197, respectively, as is the port 201 which is connected to the conduit 181 via a conduit 209 and a junction 211. The ports 199 and 201 thus form a common port of the flow control valve 185 because they are both connected to the conduit 181 downstream of the cooler 183. Two ports 199, 201 are shown only for sake of clarity; in actuality, only a single port, for example 199 or 201, is provided for the conduit 181 on the volume control valve 185, wherein according to an alternative embodiment, the volume control valve 185 may in fact be formed as 5/3-way switching valve with the two separate ports 199, 201. To facilitate understanding, the following discussions refer to the illustrated embodiment, bearing in mind that the ports 199 and 201 are actually only a single port that is switched accordingly. The port 203 is connected to a conduit 213 which leads via a pressure filter 215 to the tank 3. The pressure filter 215 can be bypassed by a bypass 217 with a differential pressure valve 219 that opens in the direction of the tank 3.

The port 205 of the volume control valve 185 is connected to a first cooling system 221 particularly for the first clutch K1. The port 207 is connected to a second cooling system 223 particularly for the second clutch K2.

In the first extreme state the volume control valve 185 illustrated in FIG. 1, the port 201 is connected to the port 203, while the ports 199, 205 and 207 are connected blind. The total hydraulic medium flow flowing in the hydraulic conduit 181 and through the cooler 183, respectively, is then conveyed via the ports 201, 203 into the conduit 213 and thus via the pressure filter 215 into the tank 3.

In a second extreme state, the ports 199 and 205 are connected to each other, while the ports 201, 203 and 207 are connected blind. In this state, the entire hydraulic medium flow reaching the volume control valve 185 is supplied to the first cooling system 221.

In a third extreme state of the volume control valve 185, the ports 199 and 207 are connected together. The ports 201, 203 and 205 are connected blind. In this state, the entire hydraulic medium flow flowing in the conduit 181 is therefore supplied to the second cooling system 223.

As already stated, the volume control valve 185 is designed as a proportional valve so that the intermediate states between the described extreme states can be adjusted so that the volume flow to the cooling systems 221, 223 or to the pressure filter 215 can be adjusted. The volume control valve 185 can also be operated in pulsed mode, wherein each of the three extreme states is adopted at least temporarily. The volume flow conveyed to the cooling systems 221, 223 and the pressure filter 215, respectively, and hence to the tank 3 is controlled or regulated in this mode of operation, when averaged over time.

FIG. 1 shows that a hydraulic medium flow of the conduit 57 can be added to the hydraulic medium in the conduit 181 and supplied to the hydraulic sub-circuit 59. Alternatively, only the conduit 57 may supply hydraulic medium. It should also be mentioned that the proportional valves 101, 101', 141, 159, 159', 179, 179', 185 can each be electrically proportionally adjusted, in particular against a spring force.

As already stated above, the conduit 57 opens into the hydraulic sub-circuit 59, more precisely into the conduit 181 downstream of the pump 9. According to an alternative unillustrated embodiment, the conduit 57 opens into the conduit 181 preferably downstream of the cooler 183. By supplying the hydraulic medium from the high pressure circuit into the hydraulic sub-circuit 59 according to the alternative embodiment, the total volume flow through the cooler 183 is reduced. With the reduced volume flow, the pressure drop across the cooler 183 is reduced, thereby also reducing the necessary drive power for the pump 7 and/or 9. The energy required for driving the electric motor 5 is reduced by reducing the backpressures. According to another embodiment, the pump 9 can be directly connected to the electric motor 5, i.e. the illustrated clutch 11 can be eliminated, when the backpressures or the pressure level are sufficiently reduced, irrespective of how the reduction is achieved.

According to an additional unillustrated embodiment regarding the arrangement of the pressure filter 215, the pressure filter 215 is arranged in the conduit 213 not between the volume control valve 185 and the tank 3, but preferably in the conduit 181, in particular between the cooler 183 and the volume control valve 185. Preferably, the conduit 57 opens into conduit 181 downstream of the pressure filter 215. With this alternative arrangement of the pressure filter 215, which is now in the main flow of the hydraulic medium, the fraction of time during which the hydraulic medium is filtered by the filter pressure 215 is increased. The bypass valve 219 is preferably designed for a minimum backpressure over the volume flow.

Figure 2:
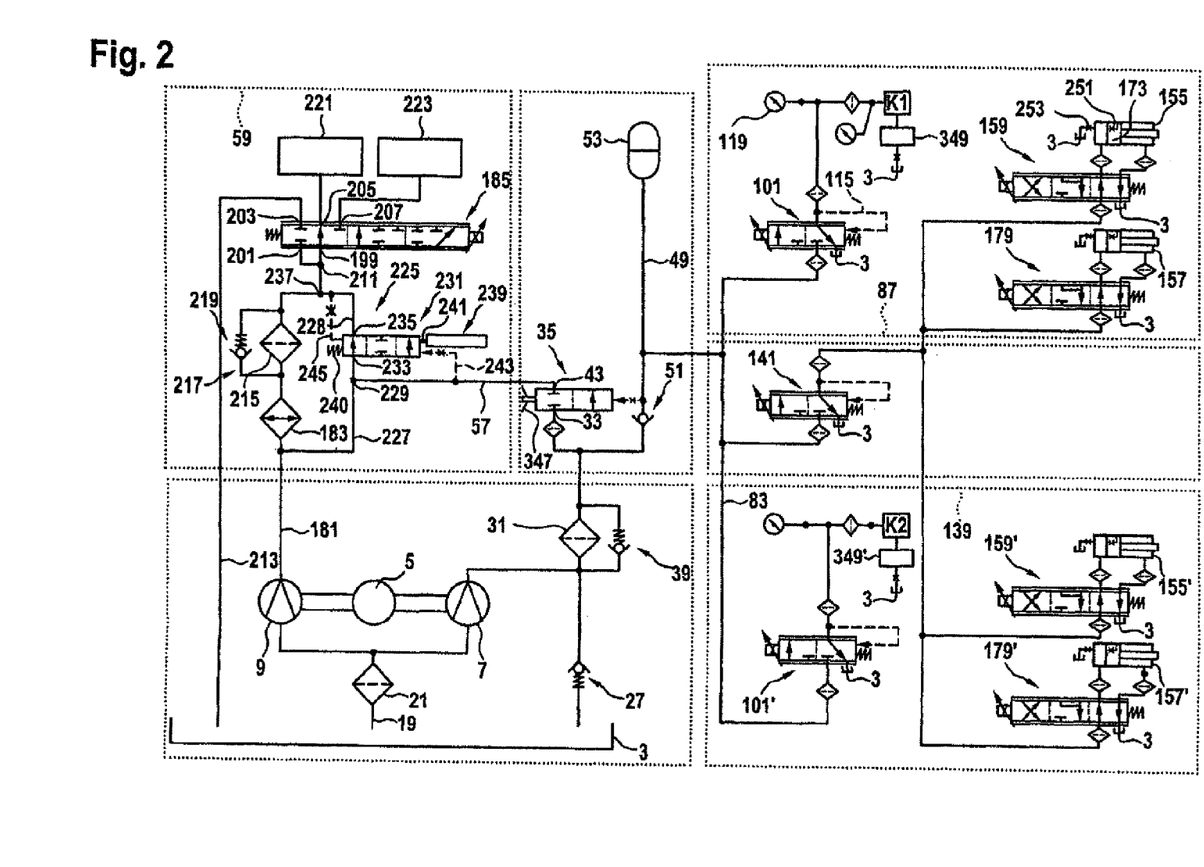
FIG. 2 shows a preferred embodiment of the hydraulic circuit.

FIG. 2 shows a preferred exemplary embodiment of the hydraulic circuit 1, in particular with respect to the cooler 183 and the pressure filter 215, wherein known elements are indicated with the same reference numerals, so that reference is made to the above description. The following will mainly address only the differences.

The main difference to the previous exemplary embodiment is that a bypass 225 is associated with the cooler 183 and the pressure filter 215. For this purpose, the pressure filter 215 together with its bypass 217 is provided downstream of the flow control valve 185 in the conduit 181. A conduit 227 branches off upstream of the cooler 183, which is joined at a junction 229 with the conduit 57. A bypass valve 231 configured as a 2/3-way valve, in particular a switching valve or proportional valve, with two ports 233 and 235 provided downstream of the junction 229. The port 233 is connected to the junction 229, while the port 235 is connected to the conduit 181 via a node 237 and a conduit 228. The bypass valve 231 has three switching positions, wherein in a first switching position the port 233 is connected to port 235, in an intermediate second switching position both ports are connected blind, and in a third switching position the ports 233 and 235 are once again connected to each other. The bypass 225 is thus open in the first switching position, blocked in the second position and open again in the third switching position. The different switching positions can preferably only be approached in the indicated order. The bypass valve 231 is constructed as a thermostatic bypass valve 231 and includes for this purpose a thermostatic actuator unit or thermal unit 239, which includes a thermal element acting on the bypass valve 231, and in particular a slider or rotary vane of the bypass valve 231. For this purpose, the thermal element is designed as an expanding thermal element and is connected via a link 241 with the bypass valve 231 or its slider or rotary vane. The expanding thermal element applies a force on the bypass valve 231 against the force of a spring element 240 in order to move the bypass valve 231 from the first switching position into the second switching position. The thermal unit or the thermal element 239 and the link 241 are configured so that the thermostatic bypass valve 231 can be moved or switched by the thermal element maximally into the second switching position. For this purpose, for example the size of the thermal element and/or its coefficient of thermal expansion are selected accordingly or a travel stop is associated with the link 241, which prevents movement of the bypass valve 231 by the thermal element from the second switching position in the direction of the third switching position. It is also conceivable to provide a sufficient width of the respective switching position. Furthermore, a conduit 243 is provided which leads from the conduit 57 to a first valve face of the bypass valve 231. In addition, a conduit 245 is provided which runs from the conduit 227 downstream of the bypass valve 231 to a second valve face of the bypass valve 231 which opposes the first valve face, so that the pressures of the lines 57 and 228 pressurize the bypass valve 231 in opposite directions so that the bypass valve 231 operates as a differential pressure valve, wherein a corresponding pressure in the conduit 57 causes the bypass valve 231 to move from the second switching position to the third switching position. Alternatively, it is conceivable to provide only the conduit 243 and to use the pressure the spring force of the spring element 240 and/or of another spring element as the opposing force, wherein the pressure limit value can be adjusted with the presettable spring force.

The operation of the thermostatic bypass valve 231 will be now described. At low temperatures, for example during a cold start, the bypass valve 231 is in its first switching position so that the hydraulic medium conveyed by the pumps 7 and 9 is supplied to the cooling systems 221 and/or 223 bypassing the cooling cooler 183 and the pressure filter 215. This has the advantage that, on one hand, the already cool hydraulic medium is used for cooling and, on the other hand, the hydraulic medium which, when cold, is highly viscous due to its temperature-dependent viscosity need not be conveyed through the cooler 183 and the pressure filter 215. This reduces pressure drops, in particular the backpressure, which affects the conveying device (pumps 7 and 9 and electric motor 5). When the temperature increases and thus the viscosity of the hydraulic medium is improved, the thermal element gets bigger and urges the link 241 against the slider of the bypass valve 231 so as to move the bypass valve 231 from the first switching position (as shown) into its second switching position, in which the bypass 225 is blocked. From this time on, the hydraulic medium is conveyed through the cooler 183 and the pressure filter 215 to the cooling systems 221 and 223. The bypass valve 219 limits the flow when backpressure builds up, for example due to switching operation of the volume control valve 185, or because the pressure filter 215 is clogged or because the cooler 183 is faulty, or when the volume flow through the cooler and pressure filter exceeds a limit that could potentially damage the pressure filter 215 and/or the cooler 183. Alternatively, the pressure acts on the bypass valve 231 via the lines 243 and 245 such that the bypass valve 231 is moved from the second switching position to its third switching position where the bypass 225 is opened again, so that the hydraulic medium can be conveyed bypassing the cooler 183 and the pressure filter 215. According to another embodiment, the bypass 217 may also be omitted. When the pressure across the bypass valve 231 drops again below the respective limit value, the bypass valve 231 is again moved by the spring element 240 into its second switching position 225 where the bypass is blocked. When the temperature falls below a specified limit value, the thermal element contracts again and the bypass valve 231 is again moved back into its first switching position by the spring force or positively guided by the thermal element.

With the preferred embodiment of the hydraulic circuit 1 relative to the bypass valve 231, the pumps 7, 9 are also protected against excessive backpressure that would otherwise cause damage to the actuator or to an insufficient supply of hydraulic medium, or prevent the start of the respective pump 7, 9 and/or cause excessive energy consumption. The conveying device is thus relieved at low temperatures, since only the backpressure for producing flow through the bypass valve 231 acts on the pump 7, 9. The conveying device, in particular the pumps 7, 9, can then to be reduced in size and, as shown in the present exemplary embodiment, the clutch 11 can be eliminated, i.e. the electric motor 5 can be connected directly to the pump 9. Moreover, the power output stages of an electronic control unit for controlling the hydraulic circuit and the power-conducting components can also be made smaller. By including the thermostatic bypass valve 231, the pressure relief valve 191, as illustrated, is preferably omitted, because the thermostatic bypass valve 231 now assumes the pressure relief function.

FIG. 2 also shows additional embodiments of designs known from FIG. 1, which can be provided in addition to the formation of the bypass 225.

According to another embodiment illustrated in FIG. 2 and alternatively to the embodiment of the volume control valve 185 illustrated and described in FIG. 1, the switching position ranges are interchanged such that in the first switching position range the ports 199 and/or 201 are connected to the port 205 or 207 while the other ports of the volume control valve 185 are connected blind, in the second switching position range the ports 201 and/or 199 are connected to the port 3 while the other ports are connected blind, and in the third switching position range the ports 199 and/or 201 are connected to the port 207 or 205 while the remaining ports are connected blind. Interchanging the switching positions prevents, when using pulsed control for the volume control valve 185 for setting a desired hydraulic medium flow for one of the cooling systems 221 and 223, respectively, the hydraulic medium from flowing also to the other cooling system 223 or 221. Instead, the volume flow that is not conveyed to the respective cooling system 221 or 223 under pulsed operation is directed into the tank 3. In the actual design of the volume control valve 185 as a 4/3-way proportional valve, the ports 199 and 201 are always to be understood as a common or sole port for the conduit 181 to the volume control valve 185, so that in fact only one of the two ports 199, 201 is provided on the volume control valve 185.

Alternatively to the embodiment of the switching valve 35 shown in FIG. 1, the switching valve 35 according to the present exemplary embodiment is formed as 2/3-way switching valve which includes only the ports 33 and 43. Instead of the return lines 68 and 63 and the valve faces 67 and 65, the switching valve 35 is provided with a plate spring 247 producing a switching hysteresis of the switching valve 35, as described above. Only the pressure from the conduit 49 opposes the plate spring 247.

According to the exemplary embodiment of FIG. 2, as an alternative to the pressure sensor 55 a charge requirement of the accumulator 53 is detected via the current consumption of the electric motor 5. Different backpressures operate depending on the position of the switching valve 35, which result in different output powers of the electric motor 5. The position of the switching valve 35 can be inferred from the current draw, allowing the charge requirement of the accumulator to be recognized.

In addition, FIG. 2 shows alternatives for controlling the clutches K1 and K2. Only the pressure control valve 101 or 101' is connected upstream of the clutches K1 and K2, respectively, wherein the reference conduit 115 does not branch off downstream of the clutch K1, but instead upstream of the clutch K1 or K2 and returns the pressure. Instead, an emergency switching system 249 and 249', respectively, is associated with the respective clutch, which switches the respective clutch unpressurized upon detecting an implausible clutch pressure. Furthermore, several pressure filters are connected upstream of the clutches K1 and K2, whereby another pressure sensor is arranged upstream of at least the clutch K1, with a pressure filter once more connected upstream.

FIG. 2 also shows another exemplary embodiment of the gear actuator, which differs from the gear actuator shown in FIG. 1 mainly in that the respective piston 173 includes a pressure-controlled vent valve 251 and the respective gear actuator cylinder 155, 155', 157, 157' also includes a vent valve 253. The output of the vent valve 251 is hereby associated with the same chamber as the inlet of the vent valve 253, whose outlet in turn is associated with the tank 3. Both chambers of the respective gear actuator can thus be vented, so that the respective gear actuator is always quickly accessible or operable. Additional pressure filters are associated with the gear actuators, the volume control valves 159, 159', 179, 179' and the pressure control valve 141.

By providing the switching valve 35, the pressure relief valve 27 can be omitted. One or more of the alternative embodiments described herein and shown in FIG. 2 can of course be independently integrated in the hydraulic circuit 1 of FIG. 1.

What is claimed is:

1. A clutch transmission having a hydraulic circuit for cooling the clutch transmission, the hydraulic circuit comprising:
    at least one pump,
    at least one cooler arranged in a first conduit for cooling a hydraulic medium conveyed by the at least one pump,
    a bypass associated with the cooler and having a thermostatic bypass valve constructed as a 2/3-way valve having two ports and three switching positions, with the bypass having a second conduit branching off from the first conduit upstream of the cooler and a third conduit connected to the first conduit downstream of the cooler, wherein one of the two ports is connected to the second conduit upstream of the cooler and the other of the two ports is connected to the third conduit downstream of the cooler, and wherein the bypass valve is configured for movement by a spring force into a first switching position where the bypass is open, for movement from the first switching position against the spring force by a thermal element into a second switching position where the bypass is closed, and for movement from the second switching position against the spring force by a difference pressure into a third switching position where the bypass is open, and
    said thermal element arranged outside of the bypass valve, wherein the thermal element is formed as an expanding thermal element which increases in size with increasing temperature and which is connected via a link with a slider or rotary vane of the bypass valve.

2. The clutch transmission of claim 1, wherein the clutch transmission is a dual clutch transmission.

3. The clutch transmission of claim 1, wherein the difference pressure is a pressure difference between pressures upstream and downstream of the thermostatic bypass valve.

4. The clutch transmission of claim 1, further comprising a pressure filter, wherein the bypass is associated with the pressure filter.

\* \* \* \* \*